United States Patent
Nomura et al.

(10) Patent No.: US 12,541,050 B2
(45) Date of Patent: Feb. 3, 2026

(54) METHOD FOR MANUFACTURING OPTICAL FIBER AND OPTICAL FIBER

(71) Applicant: SUMITOMO ELECTRIC INDUSTRIES, LTD., Osaka (JP)

(72) Inventors: Takahiro Nomura, Osaka (JP); Kazuyuki Sohma, Osaka (JP); Iwao Okazaki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 141 days.

(21) Appl. No.: 18/229,343

(22) Filed: Aug. 2, 2023

(65) Prior Publication Data

US 2024/0053535 A1     Feb. 15, 2024

(30) Foreign Application Priority Data

Aug. 10, 2022   (JP) .................... 2022-127774

(51) Int. Cl.
| | |
|---|---|
| *G02B 6/02* | (2006.01) |
| *C03B 37/025* | (2006.01) |
| *C03C 25/106* | (2018.01) |

(52) U.S. Cl.
CPC ........ *G02B 6/02395* (2013.01); *C03B 37/025* (2013.01); *C03C 25/106* (2013.01); *C03B 2203/02* (2013.01)

(58) Field of Classification Search
CPC .............. G02B 6/02395; C03B 37/025; C03B 2203/02; C03C 25/106
See application file for complete search history.

(56) References Cited

U.S. PATENT DOCUMENTS

| | | | | |
|---|---|---|---|---|
| 4,168,907 A | * | 9/1979 | Presby | G01N 21/958 |
| | | | | 356/73.1 |
| 4,964,071 A | * | 10/1990 | Grosvenor | G01B 7/12 |
| | | | | 702/157 |

(Continued)

FOREIGN PATENT DOCUMENTS

| | | |
|---|---|---|
| JP | S60-238737 A | 11/1985 |
| JP | 2014-066558 A | 4/2014 |
| JP | 2018-045028 A | 3/2018 |

OTHER PUBLICATIONS

Quinten, Michael, On the use of fast Fourier transform for optical layer thickness determination, SN Applied Sciences (2019) 1:823 | https://doi.org/10.1007/s42452-019-0866-9 (Year: 2019).*

(Continued)

*Primary Examiner* — Peter Radkowski
(74) *Attorney, Agent, or Firm* — Faegre Drinker Biddle & Reath LLP

(57) ABSTRACT

A method for manufacturing an optical fiber includes: melting an optical fiber preform and drawing a glass fiber; applying a resin composition to an outer periphery of the glass fiber; and curing the resin composition applied, wherein an amount of eccentricity of a central axis of the glass fiber, in a cross section perpendicular to the central axis of the glass fiber, from a central axis relative to an outer periphery of the resin composition or an outer periphery of a coating resin layer formed by curing the resin composition is measured at 50 points or more over a length range of 50 m or more of the glass fiber, and wherein the resin composition is applied such that a mean value a and a standard deviation σ of the amount of eccentricity satisfy a+3σ≤10 μm.

8 Claims, 10 Drawing Sheets

(56) References Cited

U.S. PATENT DOCUMENTS

| | | | |
|---|---|---|---|
| 5,298,047 A * | 3/1994 | Hart, Jr. | C03B 37/027 65/435 |
| 5,341,205 A * | 8/1994 | McLandrich | G01B 11/0675 356/73.1 |
| 5,418,881 A * | 5/1995 | Hart, Jr. | G02B 6/105 385/11 |
| 5,440,141 A * | 8/1995 | Horie | G01B 11/0625 356/504 |
| 5,523,840 A * | 6/1996 | Nishizawa | G01B 11/0625 356/497 |
| 5,565,986 A * | 10/1996 | Knuttel | G01J 9/02 356/497 |
| 5,633,712 A * | 5/1997 | Venkatesh | G01N 21/41 356/479 |
| 5,731,876 A * | 3/1998 | Venkatesh | G01B 11/0675 356/73.1 |
| 6,134,003 A * | 10/2000 | Tearney | G01N 21/4795 356/497 |
| 6,226,086 B1 * | 5/2001 | Holbrook | G01B 11/0616 356/630 |
| 6,324,872 B1 * | 12/2001 | Blaszyk | C03B 37/032 65/402 |
| 6,496,265 B1 * | 12/2002 | Duncan | G01L 9/0079 356/479 |
| 6,550,283 B2 * | 4/2003 | Blaszyk | C03B 37/032 264/1.24 |
| 6,661,502 B1 * | 12/2003 | Jakobsen | G01B 11/2433 356/73.1 |
| 6,735,985 B2 * | 5/2004 | DiGiovanni | G02B 6/02 65/475 |
| 6,791,678 B2 * | 9/2004 | Huang | C03B 37/02745 356/73.1 |
| 6,922,596 B2 * | 7/2005 | Erickson | G05B 5/01 700/32 |
| 6,937,325 B2 * | 8/2005 | Ingles, Jr. | G01M 11/37 356/73.1 |
| 6,961,123 B1 * | 11/2005 | Wang | G01N 21/21 356/364 |
| 7,043,128 B2 * | 5/2006 | DiGiovanni | G02B 6/0288 385/104 |
| 7,057,735 B2 * | 6/2006 | Jasapara | G01B 11/105 356/485 |
| 7,170,610 B2 * | 1/2007 | Knuttel | G01N 21/4795 356/497 |
| 7,271,916 B2 * | 9/2007 | Jasapara | G01B 11/105 356/497 |
| 7,539,381 B2 * | 5/2009 | Chen | G02B 6/02395 385/127 |
| 7,633,608 B2 * | 12/2009 | Otosaka | G01B 11/2408 356/73.1 |
| 7,907,482 B2 * | 3/2011 | Zhou | G11B 17/0405 369/53.14 |
| 8,593,640 B2 * | 11/2013 | Kim | G01N 21/4795 356/497 |
| 8,699,038 B2 * | 4/2014 | Schoenleber | G01B 9/00 438/8 |
| 9,230,817 B2 * | 1/2016 | Schoenleber | B24B 49/12 |
| 9,297,645 B2 * | 3/2016 | Schönleber | G01B 9/02091 |
| 9,494,409 B2 * | 11/2016 | Schönleber | G01N 21/9501 |
| 9,500,471 B2 * | 11/2016 | Michelt | G01B 11/0608 |
| 9,677,871 B2 * | 6/2017 | Schönleber | G01B 11/14 |
| 9,982,994 B2 * | 5/2018 | Schönleber | G01B 11/14 |
| 10,048,437 B2 * | 8/2018 | Morita | G02B 6/443 |
| 10,353,191 B2 * | 7/2019 | Anthony | H04N 1/00018 |
| 11,054,573 B2 * | 7/2021 | Bickham | G02B 6/0281 |
| 11,119,270 B2 * | 9/2021 | Bickham | G02B 6/02395 |
| 11,256,027 B2 * | 2/2022 | Kohda | G01M 11/37 |
| 11,602,271 B2 * | 3/2023 | Holland | G02B 6/02395 |
| 2002/0026813 A1 * | 3/2002 | Blaszyk | C03C 25/005 65/402 |
| 2003/0128942 A1 * | 7/2003 | DiGiovanni | G02B 6/0288 385/123 |
| 2004/0003628 A1 * | 1/2004 | Shimazu | C03B 37/032 65/402 |
| 2004/0017557 A1 * | 1/2004 | Huang | G01M 11/088 356/73.1 |
| 2004/0030416 A1 * | 2/2004 | Erickson | G05B 5/01 700/28 |
| 2004/0089025 A1 * | 5/2004 | Kuwahara | C03B 37/029 65/382 |
| 2004/0145747 A1 * | 7/2004 | Jasapara | G01B 11/105 356/485 |
| 2004/0150811 A1 * | 8/2004 | Ingles, Jr. | G01M 11/37 356/73.1 |
| 2004/0223715 A1 * | 11/2004 | Benoit | G02B 5/0833 385/123 |
| 2004/0227952 A1 * | 11/2004 | Jasapara | C03B 37/0253 356/479 |
| 2004/0228590 A1 * | 11/2004 | DiGiovanni | G02B 6/0288 385/123 |
| 2005/0188728 A1 * | 9/2005 | Zhiou | C03B 37/02745 65/402 |
| 2005/0190371 A1 * | 9/2005 | Knuttel | G01N 21/4795 356/479 |
| 2008/0192239 A1 * | 8/2008 | Otosaka | G01B 11/2408 356/73.1 |
| 2008/0279059 A1 * | 11/2008 | Zhou | G11B 17/05 369/44.32 |
| 2008/0279516 A1 * | 11/2008 | Chen | G02B 6/02395 385/124 |
| 2010/0220333 A1 * | 9/2010 | Kim | G01B 9/02037 356/479 |
| 2011/0261371 A1 * | 10/2011 | Schoenleber | H01L 21/67253 356/630 |
| 2012/0257213 A1 * | 10/2012 | Schonleber | G01B 9/02091 356/485 |
| 2012/0320380 A1 * | 12/2012 | Schonleber | G01B 9/02044 356/479 |
| 2014/0315333 A1 * | 10/2014 | Schoenleber | H01L 21/67253 356/630 |
| 2014/0368830 A1 * | 12/2014 | Michelt | G01B 11/0608 356/485 |
| 2015/0260504 A1 * | 9/2015 | Schonleber | G01B 9/02091 356/478 |
| 2017/0234678 A1 * | 8/2017 | Schönleber | G01B 9/02091 356/511 |
| 2017/0371142 A1 * | 12/2017 | Anthony | H04N 1/00 |
| 2018/0074258 A1 * | 3/2018 | Morita | G02B 6/036 |
| 2019/0269320 A1 * | 9/2019 | Holland | A61B 3/102 |
| 2020/0062643 A1 * | 2/2020 | Bookbinder | B05D 3/061 |
| 2020/0257043 A1 * | 8/2020 | Kohda | G01M 11/37 |
| 2020/0271857 A1 * | 8/2020 | Bickham | G02B 6/0281 |
| 2020/0271858 A1 * | 8/2020 | Bickham | G02B 6/0281 |
| 2023/0218162 A1 * | 7/2023 | Holland | G02B 6/02395 600/425 |

OTHER PUBLICATIONS

Shpak et al., Online measurement of optical fibre geometry during manufacturing, Proc. SPIE 10683, Fiber Lasers and Glass Photonics: Materials through Applications, 1068318 (May 17, 2018); https://doi.org/10.1117/12.2314762 (Year: 2018).*

Donnelly and Rust, The fast Fourier transform for experimentalists. Parts I-IV, Computing in Science & Engineering, vol. 7, No. 2 and vol. 7, No. 4, 2005 (Year: 2005).*

Jasapara et al., Characterization of coated optical fibers by Fourier-domain optical coherence tomography, Opt. Lett. 30, 1018-1020 (2005) (Year: 2005).*

Apicella et al., Fast Fourier Transform and autocorrelation function for the analysis of complex mass spectra, International Journal of Mass Spectrometry, vol. 338, 2013, pp. 30-38, ISSN 1387-3806, https://doi.org/10.1016/j.ijms.2013.01.003. (Year: 2013).*

Shimazaki et al., A Method for Selecting the Bin Size of a Time Histogram, Neural Computation 19, 1503-1527 (2007) (Year: 2007).*

\* cited by examiner

METHOD FOR MANUFACTURING OPTICAL FIBER AND OPTICAL FIBER

TECHNICAL FIELD

The present disclosure relates to a method for manufacturing an optical fiber. This application claims priority based on Japanese Patent Application No. 2022-127774 filed on Aug. 10, 2022, the entire contents of which are incorporated herein by reference.

BACKGROUND

An optical fiber including a glass fiber and a resin coating layer covering an outer periphery of the glass fiber is known (for example, Japanese Unexamined Patent Publication No. 2018-45028 (Patent Literature 1), Japanese Unexamined Patent Publication No. S60-238737 (Patent Literature 2), and Japanese Unexamined Patent Publication No. 2014-66558 (Patent Literature 3)). Patent Literature 1 discloses defining the standard deviation of an outer diameter of a glass part. Patent Literature 2 discloses a method for detecting the thickness deviation of a coating. Patent Literature 3 discloses a method of on-line measurement of the variation in the thickness deviation of an optical fiber.

SUMMARY

A method for manufacturing an optical fiber according to one aspect of the present disclosure includes: melting an optical fiber preform and drawing a glass fiber; applying a resin composition to an outer periphery of the glass fiber; and curing the resin composition applied, wherein an amount of eccentricity of a central axis of the glass fiber, in a cross section perpendicular to the central axis of the glass fiber, from a central axis relative to an outer periphery of the resin composition or an outer periphery of a coating resin layer formed by curing the resin composition is measured at 50 points or more over a length range of 50 m or more of the glass fiber, and wherein the resin composition is applied such that a mean value a and a standard deviation $\sigma$ of the amount of eccentricity satisfy $a+3\sigma \leq 10$ μm.

An optical fiber according to one aspect of the present disclosure includes a glass fiber, and a coating resin layer covering an outer periphery of the glass fiber, wherein when an amount of eccentricity of a central axis of the glass fiber, in a cross section perpendicular to the central axis of the glass fiber, from a central axis relative to an outer periphery of the coating resin layer is measured at 500 points or more over a length range of 50 km or more of the glass fiber, a mean value a and a standard deviation $\sigma$ of the amount of eccentricity satisfy $a+3\sigma \leq 10$ μm.

DETAILED DESCRIPTION

Figure 1:
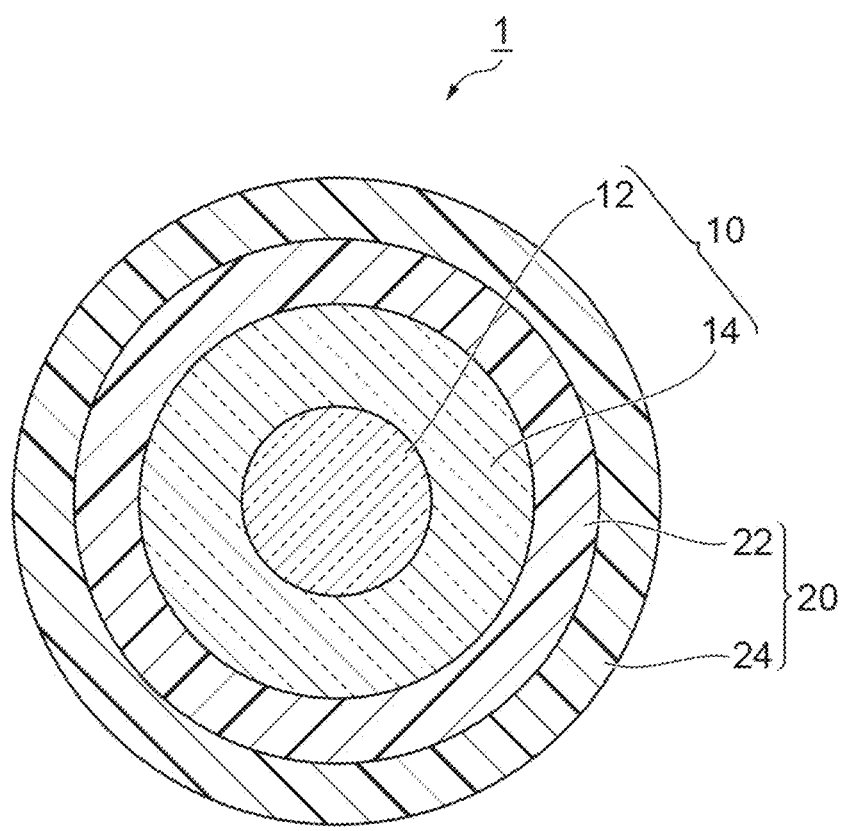
FIG. 1 is a diagram illustrating a cross section perpendicular to a length direction of an optical fiber according to an embodiment.

[Problems to be Solved by the Present Disclosure]

An optical fiber may break when an amount of eccentricity of a glass fiber from a central axis relative to an outer periphery of a coating resin layer increases.

It is an object of the present disclosure to provide a method for manufacturing an optical fiber and an optical fiber which are capable of suppressing breakage of the optical fiber.

[Advantageous Effects of the Present Disclosure]

The present disclosure is capable of providing a method for manufacturing an optical fiber and an optical fiber which are capable of suppressing breakage of the optical fiber.

[Description of Embodiments of the Present Disclosure]

Embodiments of the present disclosure will first be listed and described.

(1) A method for manufacturing an optical fiber according to one aspect of the present disclosure includes: melting an optical fiber preform and drawing a glass fiber; applying a resin composition to an outer periphery of the glass fiber; and curing the resin composition applied, wherein an amount of eccentricity of a central axis of the glass fiber, in a cross section perpendicular to the central axis of the glass fiber, from a central axis relative to an outer periphery of the resin composition or an outer periphery of a coating resin layer formed by curing the resin composition is measured at 50 points or more over a length range of 50 m or more of the glass fiber, and wherein the resin composition is applied such that a mean value a and a standard deviation $\sigma$ of the amount of eccentricity satisfy $a+3\sigma \leq 10$ μm.

In the method for manufacturing an optical fiber above, the amount of eccentricity of the glass fiber can be suppressed over a length range of 50 m or more.

(2) In (1) above, the resin composition may be applied such that a histogram of the amount of eccentricity is unimodal when a class width is 1 μm. In this case, the variation in the amount of eccentricity of the glass fiber is suppressed.

(3) In (1) or (2) above, the amount of eccentricity may be measured at a sampling period of 20 ms or less. In this case, the amount of eccentricity of the glass fiber can be more reliably suppressed.

(4) In any one of (1) to (3) above, the resin composition may be applied while adjusting a position or tilt of an application device for applying the resin composition. In this case, the amount of eccentricity of the glass fiber can be adjusted.

(5) In any one of (1) to (4) above, the resin composition may be applied while adjusting a position of the optical fiber preform, or a position of a roller disposed directly below a curing device and configured to change a running direction of the optical fiber, the curing device being configured to cure the resin composition. In this case, the amount of eccentricity of the glass fiber can be adjusted.

(6) In any one of (1) to (5) above, the amount of eccentricity may be measured before the curing step, and may be measured as an amount of eccentricity of the glass fiber from the central axis relative to the outer periphery of the resin composition. Even in this case, the amount of eccentricity of the glass fiber can be suppressed over the length range above.

(7) In any one of (1) to (5) above, the measuring step may be performed after the curing step, and the amount of eccentricity may be measured as an amount of eccentricity of the glass fiber from the central axis relative to the outer periphery of the coating resin layer. Even in this case, the amount of eccentricity of the glass fiber can be suppressed over the length range above.

(8) An optical fiber according to one aspect of the present disclosure includes a glass fiber, and a coating resin layer covering an outer periphery of the glass fiber, wherein when an amount of eccentricity of a central axis of the glass fiber, in a cross section perpendicular to the central axis of the glass fiber, from a central axis relative to an outer periphery of the coating resin layer is measured at 500 points or more over a length range of 50 km or more of the glass fiber, a mean value a and a standard deviation σ of the amount of eccentricity satisfy $a+3\sigma \leq 10$ μm.

In the optical fiber above, the amount of eccentricity of the glass fiber can be suppressed over a length range of 50 km or more.

(9) In (8) above, a histogram of the amount of eccentricity may be unimodal when a class width is 1 μm. In this case, the variation in the amount of eccentricity of the glass fiber is suppressed.

[Details of Embodiments of the Present Disclosure]

Specific examples of a method for manufacturing an optical fiber and an optical fiber of the present disclosure will be described below with reference to the drawings. It should be noted that the present invention is not limited to these examples, but is defined by the scope of the claims and is intended to include all modifications within the meaning and scope equivalent to the scope of the claims. Same reference signs are given to the same elements in the description of the drawings, and redundant description will be omitted.

(Optical Fiber)

FIG. 1 is a diagram illustrating a cross section perpendicular to a length direction (axial direction) of an optical fiber according to an embodiment. Optical fiber 1 includes a glass fiber 10, and a coating resin layer 20 provided on an outer periphery of the glass fiber 10. In recent years, reducing of the diameter of optical fibers to densify optical cables including a plurality of optical fibers has been investigated. The optical fiber 1 is, for example, an optical fiber having a reduced diameter. A diameter of the glass fiber 10 is, for example, 60 μm or more and 125 μm or less. An outer diameter of the coating resin layer 20, that is, a diameter of the optical fiber 1 is, for example, 100 μm or more and 200 μm or less. The optical fiber 1 before being coated with a colored resin layer may be referred to as an "element wire," and an optical fiber obtained by coating the optical fiber 1 with a colored resin layer may be referred to as a "core wire" or a "colored core wire."

The glass fiber 10 includes a core 12 and a cladding 14. The cladding 14 surrounds the core 12. The core 12 and the cladding 14 mainly include glass such as quartz glass. For example, quartz glass with added germanium or pure quartz glass can be used for the core 12. Pure quartz glass or quartz glass with added fluorine can be used for the cladding 14. Here, pure quartz glass refers to quartz glass that is substantially free of impurities.

The coating resin layer 20 includes a primary resin layer 22 and a secondary resin layer 24. The primary resin layer 22 is in contact with an outer peripheral surface of the cladding 14, and coats the entire cladding 14. The secondary resin layer 24 is in contact with an outer peripheral surface of the primary resin layer 22, and coats the entire primary resin layer 22. The secondary resin layer 24 forms an outermost layer of the coating resin layer 20.

The primary resin layer 22 and the secondary resin layer 24 are formed of a cured product of an ultraviolet curable resin composition. This resin composition includes a urethane (meth)acrylate oligomer, a monomer, and a photopolymerization initiator. Here, the term "(meth)acrylate" refers to acrylate or the corresponding methacrylate. A monofunctional monomer having a polymerizable group, or a polyfunctional monomer having two or more polymerizable groups may be used as the monomer. Two or more types of monomers may be mixed. The photopolymerization initiator may be selected as appropriate from among publicly known radical photopolymerization initiators. The resin composition may further include a silane coupling agent, a photoacid generator, a leveling agent, an anti-foaming agent, an anti-oxidant, and the like.

Figure 2:
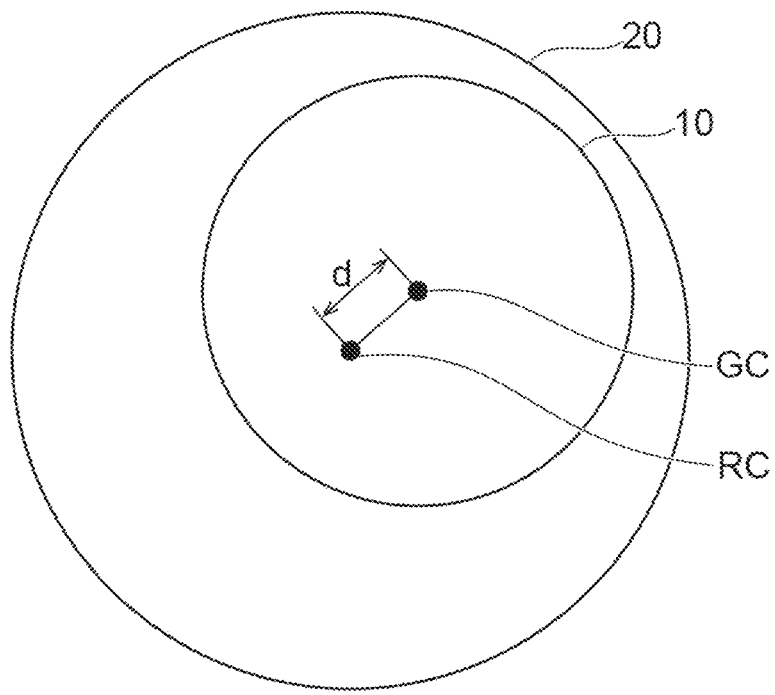
FIG. 2 is a schematic cross-sectional view for describing the definition of an amount of eccentricity of a glass fiber.

FIG. 2 is a schematic cross-sectional view for describing the definition of the amount of eccentricity of a glass fiber. As illustrated in FIG. 2, an amount of eccentricity d of the glass fiber 10 is defined as a distance (an amount of deviation in a radial direction, or an amount of displacement in the radial direction) from a central axis RC relative to an outer periphery of the coating resin layer 20 to a central axis GC of the glass fiber 10. The central axis GC is also a central axis relative to an inner periphery of the coating resin layer 20. It should be noted that the central axis RC would be set relative to an outer periphery of the resin composition to be the coating resin layer 20 before the coating resin layer 20 is cured. That is, the amount of eccentricity d may also be defined as a distance (an amount of deviation in the radial direction, or an amount of displacement in the radial direction) from the central axis RC relative to the outer periphery of the resin composition to be the coating resin layer 20 to the central axis GC of the glass fiber 10.

In the optical fiber 1, when the amount of eccentricity d is measured at 500 points or more over a length range of 50 km or more of the glass fiber 10, a mean value a and a standard deviation σ of the measured amount of eccentricity d satisfy $a+3\sigma \leq 10$ μm. The measurement interval is, for example, 100 m or less, preferably 50 m or less, and more preferably 1 m or less. Thus, in the optical fiber 1, the amount of eccentricity d is suppressed, so that breakage can be suppressed. In particular, in a case in which the optical fiber 1 has a reduced diameter, the amount of eccentricity d tends to worsen by a small misalignment of the glass fiber 10 since the coating resin layer 20 is thin. In the optical fiber 1, the amount of eccentricity d is suppressed, so that breakage of the optical fiber 1 is suppressed.

The amount of eccentricity d may be measured, for example, on-line during drawing by a measurement method performed in a measuring step S5 described further below, or off-line by other publicly known methods. In the optical fiber 1, a histogram of the measured amount of eccentricity is unimodal when a class width is 1 μm. The shape of the histogram will be described further below.

(Method for Manufacturing an Optical Fiber)

Figure 3:
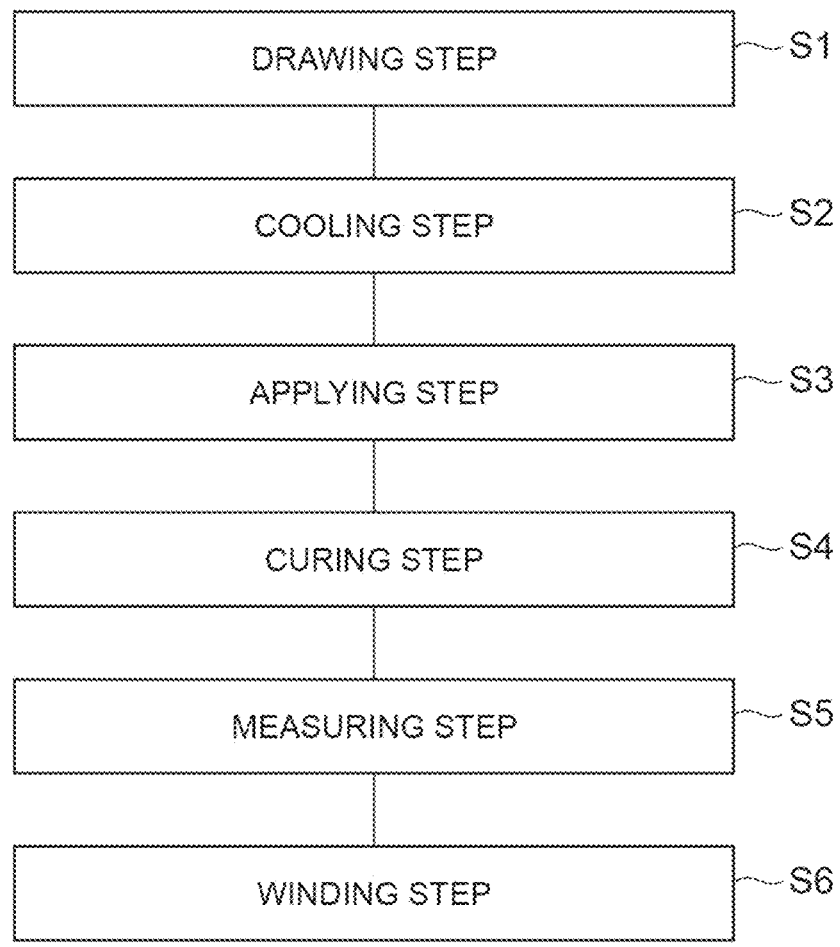
FIG. 3 is a flow chart illustrating a method for manufacturing an optical fiber according to an embodiment.

FIG. 3 is a flow chart illustrating a method for manufacturing an optical fiber according to an embodiment. As illustrated in FIG. 3, the method for manufacturing an optical fiber includes a drawing step S1, a cooling step S2, an applying step S3, a curing step S4, the measuring step S5, and a winding step S6. Steps S1 to S6 are illustrated in the order when focused on one point of the optical fiber 1 in the length direction. That is, the one point of the optical fiber 1 in the length direction is manufactured by being subjected to steps S1 to S6 in that order. It should be noted that it is only required that the measuring step S5 is performed between the applying step S3 and the winding step S6, and it may be performed before the curing step S4.

Figure 4:
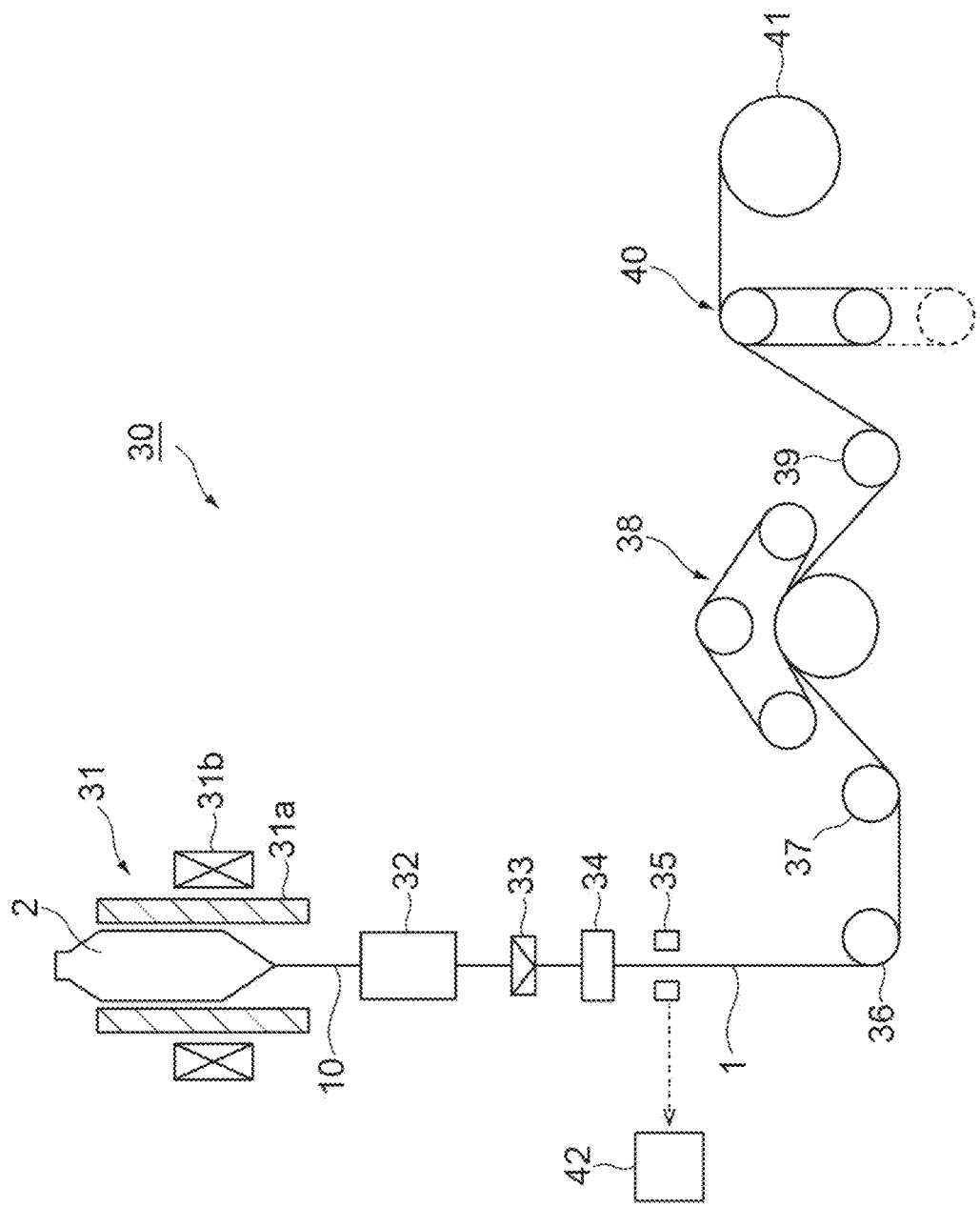
FIG. 4 is a diagram illustrating a schematic configuration of a manufacturing device used for the method for manufacturing an optical fiber according to the embodiment.

FIG. 4 is a diagram illustrating a schematic configuration of a manufacturing device used for the method for manufacturing an optical fiber according to the embodiment. As illustrated in FIG. 4, a manufacturing device 30 is a device for manufacturing the optical fiber 1 from an optical fiber preform 2. The manufacturing device 30 includes a heating furnace 31, a cooling device 32, a die 33, an ultraviolet light irradiation device 34, a measurement part 35, guide rollers 36, 37, a capstan 38, a screening device 39, a dancer roller 40, a winding bobbin 41, and a control part 42.

The steps of the method for manufacturing the optical fiber 1 will be described below with reference to FIGS. 3 and 4.

The drawing step S1 is a step of melting the optical fiber preform 2 by the heating furnace 31 and drawing the glass fiber 10. The heating furnace 31 has a cylindrical core tube 31a to the inside of which the optical fiber preform 2 is supplied, and a heating element 31b that surrounds the core tube 31a. The heating furnace 31 melts a lower end portion of the optical fiber preform 2 by heating the same. The draw speed is, for example, about 40 m/s.

The cooling step S2 is a step of cooling the glass fiber 10 that is drawn from the lower end portion of the optical fiber preform 2 by the cooling device 32. The cooling device 32 is disposed downstream of the heating furnace 31.

The applying step S3 is a step of applying an ultraviolet curable resin composition to be the coating resin layer 20 to the outer periphery of the glass fiber 10 using the die 33. The die 33 is disposed downstream of the cooling device 32. The die 33 is an application device for applying a resin composition. In this embodiment, the resin composition to be the primary resin layer 22 and the resin composition to be the secondary resin layer 24 are applied to the outer peripheral surface of the glass fiber 10 in that order.

The curing step S4 is a step of curing the resin composition by the ultraviolet light irradiation device 34. The ultraviolet light irradiation device 34 is disposed downstream of the die 33, and applies ultraviolet light to the resin composition. The resin composition is cured by the irradiation of ultraviolet light to form the coating resin layer 20. The optical fiber 1 including the glass fiber 10 and the coating resin layer 20 is thus obtained.

The measuring step S5 is a step of measuring the amount of eccentricity d of the glass fiber 10 (see FIG. 2) at 50 points or more over a length range of 50 m or more of the glass fiber 10 using the measurement part 35. The measuring step S5 is performed on-line during drawing. The measurement length is more preferably 1000 m or more. The number of data is more preferably 1000 points or more. The amount of eccentricity d is measured, for example, at a sampling period of 20 ms or less. In this case, 50 measurements are made in one second, so that if the draw speed is 40 m/s, the measurement interval is 1 m or less.

The measurement part 35 is disposed downstream of the ultraviolet light irradiation device 34. The measuring step S5 is performed after the curing step S4, but it may be performed before the curing step S4. In this case, the measurement part 35 is disposed upstream of the ultraviolet light irradiation device 34. Additionally, in this case, the central axis RC is set relative to the outer periphery of the resin composition before curing. Details of the measurement method by the measurement part 35 will be described further below.

The winding step S6 is a step of winding the optical fiber 1 on the winding bobbin 41 via the guide rollers 36, 37, the capstan 38, the screening device 39, and the dancer roller 40. The guide rollers 36, 37, the capstan 38, the screening device 39, the dancer roller 40, and the winding bobbin 41 are disposed downstream of the ultraviolet light irradiation device 34 in that order.

The guide roller 36 is a roller disposed directly below the ultraviolet light irradiation device 34 in a vertical direction. The guide roller 36 comes into contact with the optical fiber 1, and changes a running direction of the optical fiber 1 from the vertical direction to a direction different from the vertical direction. The dancer roller 40 may be disposed between the guide roller 37 and the capstan 38.

(Measurement Method)

The measurement part 35 is configured as an image recognition device of eccentricity, and has, for example, a first light source, a first imaging part, a second light source, and a second imaging part. The first light source is disposed so as to apply light to the entire optical fiber 1 to be measured in the radial direction. Light of the first light source includes a wavelength that transmits through the coating resin layer 20. The first imaging part is disposed so as to face the first light source with the optical fiber 1 to be measured interposed therebetween, and is configured to obtain an image of the light transmitted through the optical fiber 1. The second light source and the second imaging part are configured similarly to the first light source and the first imaging part, with the exception that the second light source and the second imaging part are disposed perpendicular to a facing direction of the first light source and the first imaging part.

Such configuration enables the position of the outer periphery of the coating resin layer 20 and the position of the inner periphery of the coating resin layer 20 (position of the outer periphery of the glass fiber 10) to be obtained on the basis of the light transmitted through the optical fiber 1 in the directions of the two axes orthogonal to each other and perpendicular to the central axis of the optical fiber 1, and enables the amount of eccentricity d of the glass fiber 10, which is the distance between the centers of the outer periphery of the coating resin layer 20 and the inner periphery of the coating resin layer 20 (the outer periphery of the glass fiber 10), to be measured. That is, the amount of eccentricity d can be measured without destroying the optical fiber 1.

Figure 5:
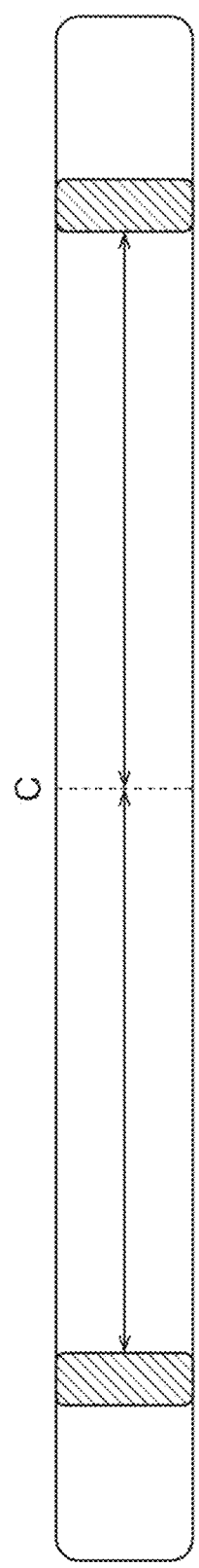
FIG. 5 is a schematic diagram illustrating an example of an observation image observed by imaging parts.
Figure 6:
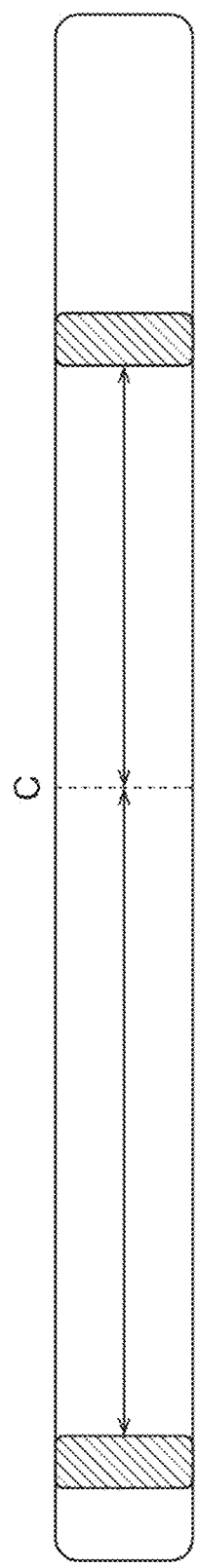
FIG. 6 is a schematic diagram illustrating an example of an observation image observed by the imaging parts.

FIGS. 5 and 6 are schematic diagrams each illustrating an example of an observation image observed by the imaging parts. The long-side direction of the observation image corresponds to the radial direction of the optical fiber 1, and the short-side direction of the observation image corresponds to the length direction of the optical fiber 1. A portion of the light emitted from the first light source is totally reflected at the outer peripheral surface of the glass fiber 10 after being transmitted through the coating resin layer 20. Due to the totally reflected light, a dark portion (shadow) corresponding to the position of the outer periphery of the glass fiber 10 (position of the inner periphery of the coating resin layer 20) is formed in the observation image. When there is no eccentricity, the distance from a center C of the observation image (center of the outer periphery of the coating resin layer 20) to the dark portion is equal on both sides as illustrated in FIG. 5. When there is eccentricity, the distance from the center C to the dark portion is not equal on both sides as illustrated in FIG. 6. The greater the amount of eccentricity d, the greater the degree of inequality of the two sides.

The measurement part 35 is communicably connected to the control part 42. The result of measurement obtained in the measuring step S3 is transmitted to the control part 42. The control part 42 analyzes the result of measurement. Specifically, the control part 42 calculates the mean value a and the standard deviation σ of the amount of eccentricity d, and creates a histogram of the amount of eccentricity d with a class width of 1 μm.

The control part 42 provides feedback control, for example, to the die 33, the heating furnace 31, or the guide roller 36 on the basis of the result of analysis. Specifically, the control part 42 adjusts the position or tilt of the die 33, adjusts the position of the optical fiber preform 2, or adjusts the position of the guide roller 36 such that the mean value a and the standard deviation σ of the amount of eccentricity d satisfy a+3σ≤10 μm. That is, the applying step S3 can include a step of adjusting the position or tilt of the die 33 such that a+3σ≤10 μm is satisfied. The drawing step S1 can include a step of adjusting the position of the optical fiber preform 2 such that a+3σ≤10 μm is satisfied. The winding step S6 can include a step of adjusting the position of the guide roller 36 such that a+3σ≤10 μm is satisfied. In the method for manufacturing the optical fiber 1, the resin composition is applied such that the mean value a and the standard deviation σ of the amount of eccentricity d satisfy a+3σ≤10 μm by making such eccentricity adjustments.

Furthermore, the control part 42 adjusts the position or tilt of the die 33, adjusts the position of the optical fiber preform 2, or adjusts the position of the guide roller 36 such that the histogram of the amount of eccentricity d is unimodal when the class width is 1 μm. That is, the applying step S3 can include a step of adjusting the position or tilt of the die 33 such that the histogram of the amount of eccentricity d is unimodal. The drawing step S1 can include a step of adjusting the position of the optical fiber preform 2 such that the histogram of the amount of eccentricity d is unimodal. The winding step S6 can include a step of adjusting the position of the guide roller 36 such that the histogram of the amount of eccentricity d is unimodal. In the method for manufacturing the optical fiber 1, the resin composition is applied such that the histogram of the amount of eccentricity d is unimodal when the class width is 1 μm by making such eccentricity adjustments.

The control part 42 constantly observes the amount of eccentricity d measured during drawing, and, for example, issues an alarm when a set threshold is exceeded. An operator can thus readjust the manufacturing device 30 or dispose of defective portions. The operator may view the results of measurement of the amount of eccentricity d to understand the status of the amount of eccentricity d, and make the eccentricity adjustments above such that the amount of eccentricity d satisfies the conditions of a good product (a+3σ≤10 μm and a unimodal histogram).

The control part 42 may be configured as a computer system which, for example, includes a processor such as a central processing unit (CPU), memories such as a random access memory (RAM) and a read only memory (ROM), input-output devices such as a touch panel, a mouse, a keyboard, and a display, and a communication device such as a network card. The control part 42 achieves the functions of the control part 42 by operating each hardware under the control of the processor based on computer programs stored in the memory.

Conventionally, there have been cases where the amount of eccentricity is inspected by measuring the cross-sectional structure at a few points of the optical fiber that was manufactured before the start of and after the end of taking out only the optical fiber manufactured at a constant draw speed, which is the so-called picking of a good optical fiber. However, since the amount of eccentricity changes in the length direction of the optical fiber, eccentricity defects that occur during the picking of a good optical fiber may be missed. When manufacturing an optical fiber, an optical fiber having, for example, a length of 3000 km to 4000 km is drawn together in a lot. For example, even a lot that has passed the eccentricity inspection at both ends of the picking of a good optical fiber may fail the eccentricity inspection by subsequently being split into 10 km to 150 km in the applying step of the colored resin layer. Optical fibers that fail the inspection are discarded until ones that pass the inspection are obtained, and this worsens the defect scrap rate and increases the inspection time. The defect scrap rate is currently about 10%.

In the method for manufacturing the optical fiber 1 according to this embodiment, the amount of eccentricity d is measured and monitored on-line, and feedback control is provided on the basis of the result of measurement to prevent the amount of eccentricity d from worsening gradually during drawing. The amount of eccentricity d is thus suppressed over the entire length of the optical fiber 1. As a result, the defect scrap rate can be reduced.

(Experimental Examples)

Experimental Examples will be described below. Optical fibers according to Examples 1 to 7 were manufactured by changing the manufacturing conditions (drawing conditions). The diameter of the glass fiber was set to 125 μm, and the diameter of the optical fiber was set to 200 μm. The amount of eccentricity was measured off-line at 1000 points or more over 1000 m for each of the optical fibers according to the Experimental Examples.

Table 1 shows the specifications of the optical fibers according to the Experimental Examples. Table 1 indicates the mean value a, 3σ, and a+3σ of the amount of eccentricity d, the defect scrap rate of one lot, and the number of modes in the histogram of the amount of eccentricity d when the class width is 1 μm.

TABLE 1

|  | a [μm] | 3σ [μm] | a + 3σ [μm] | Defect scrap rate of one lot [%] | Number of modes in histogram |
| --- | --- | --- | --- | --- | --- |
| Experimental Example 1 | 2.2 | 2.7 | 4.9 | 0.00 | 1 |
| Experimental Example 2 | 7.5 | 13.3 | 20.8 | 26.30 | 2 |
| Experimental Example 3 | 14.3 | 12.3 | 26.6 | 80.90 | 2 |

TABLE 1-continued

|  | a [μm] | 3σ [μm] | a + 3σ [μm] | Defect scrap rate of one lot [%] | Number of modes in histogram |
|---|---|---|---|---|---|
| Experimental Example 4 | 8.2 | 5.5 | 13.7 | 19.70 | 1 |
| Experimental Example 5 | 11.7 | 16.2 | 27.9 | 53.10 | 2 |
| Experimental Example 6 | 7 | 3.3 | 10.3 | 1.10 | 1 |
| Experimental Example 7 | 4.2 | 12.5 | 16.7 | 9.10 | 1 |

Figure 7:
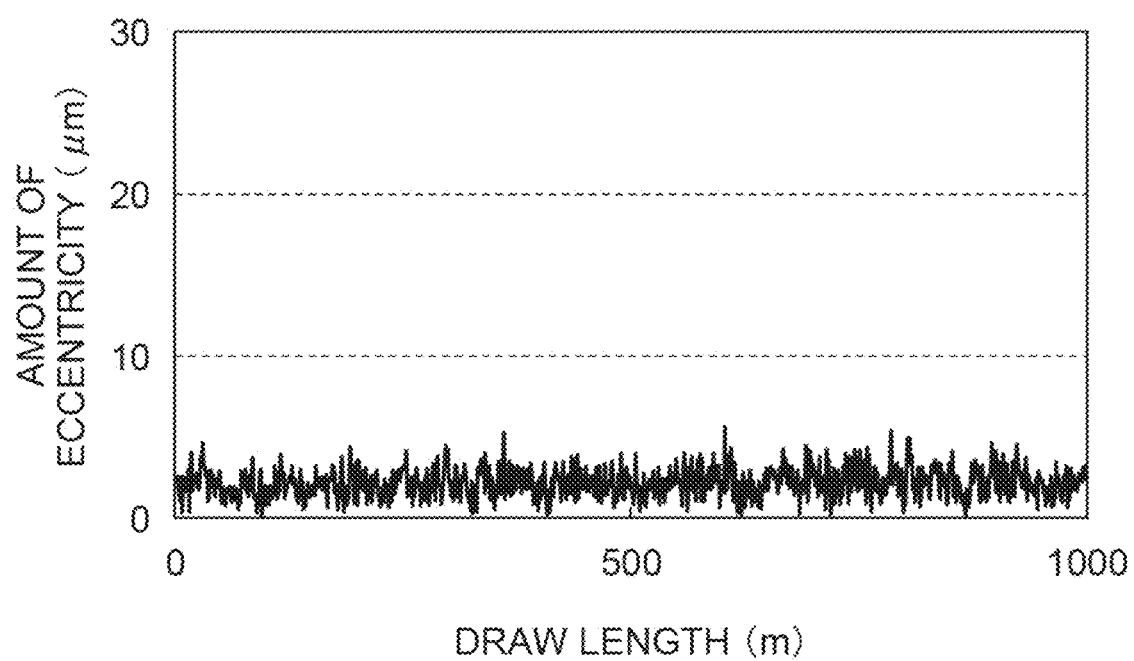
FIG. 7 is a graph illustrating a waveform of the amount of eccentricity of a glass fiber according to Experimental Example 1.
Figure 8:
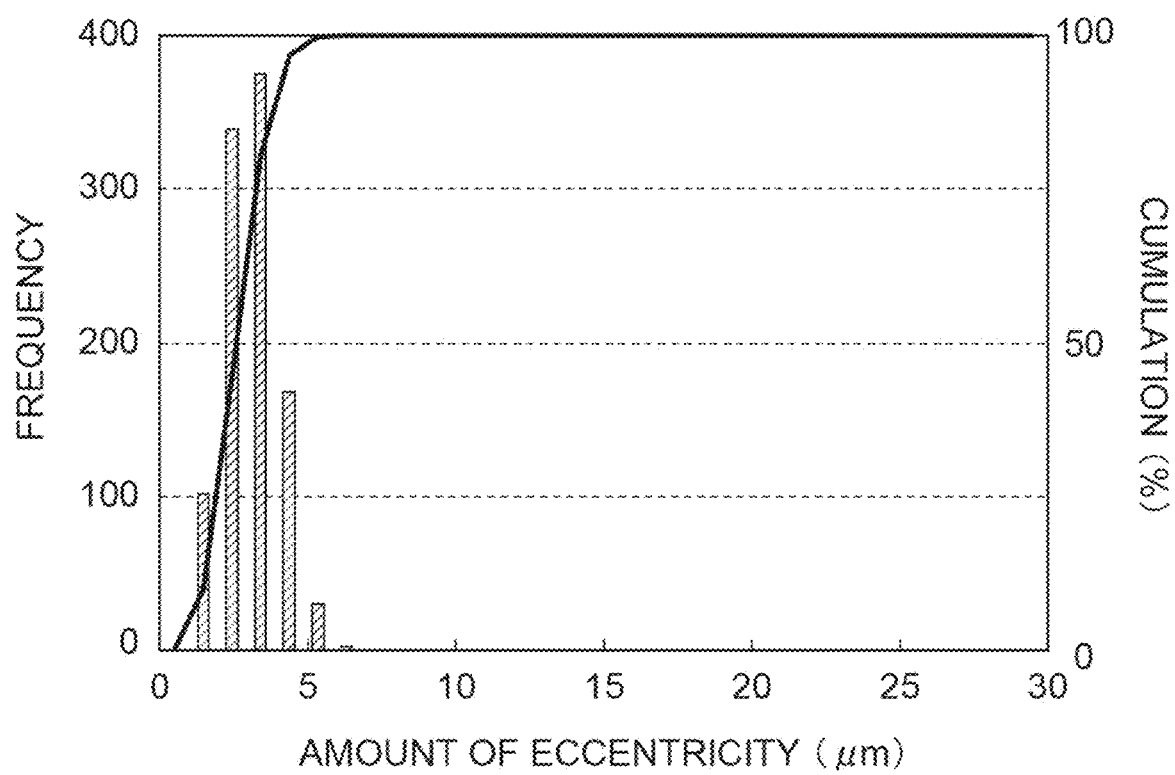
FIG. 8 is a histogram and a cumulative line graph of the amount of eccentricity of the glass fiber according to Experimental Example 1.

FIG. 7 is a graph illustrating a waveform of the amount of eccentricity of a glass fiber according to Experimental Example 1. The horizontal axis of FIG. 7 represents the draw length. The draw length corresponds to the position of the glass fiber in the axial direction. The vertical axis represents the amount of eccentricity of the glass fiber. FIG. 8 is a histogram and a cumulative line graph of the amount of eccentricity of the glass fiber according to Experimental Example 1. The horizontal axis of FIG. 8 represents the class value of the amount of eccentricity d. The left vertical axis represents the frequency. The right vertical axis represents the cumulation. In the optical fiber according to Experimental Example 1, the histogram is unimodal as illustrated in FIG. 8, and the defect scrap rate is 0% by drawing while keeping the value of a+3σ to 10 μm or less as shown in Table 1.

Figure 9:
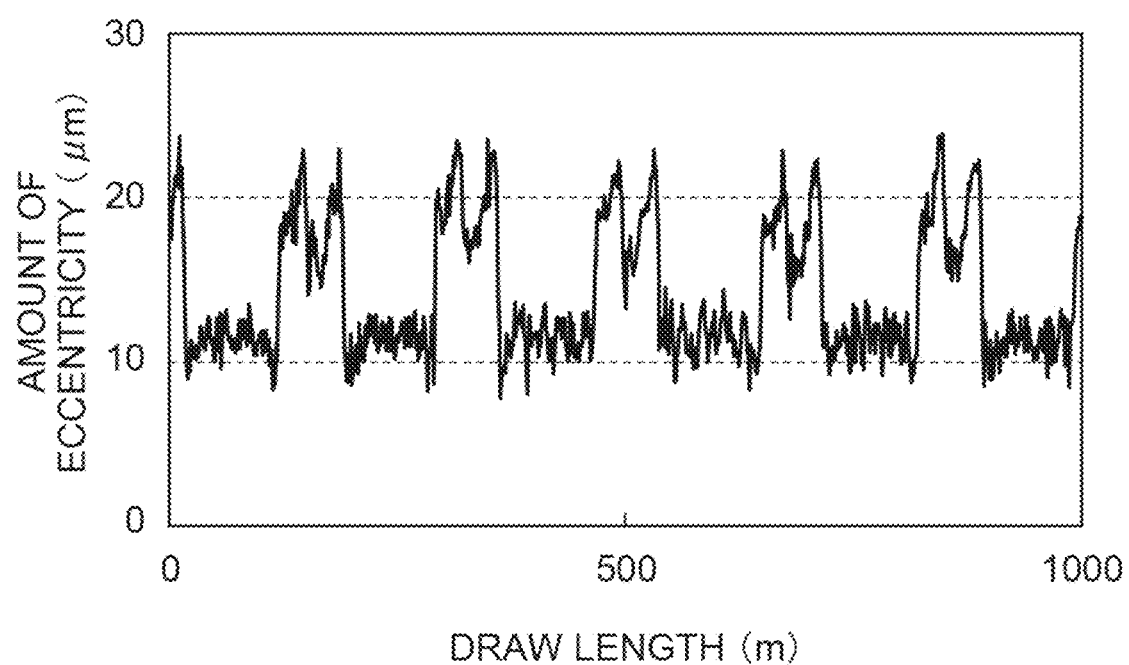
FIG. 9 is a graph illustrating a waveform of the amount of eccentricity of a glass fiber according to Experimental Example 3.
Figure 10:
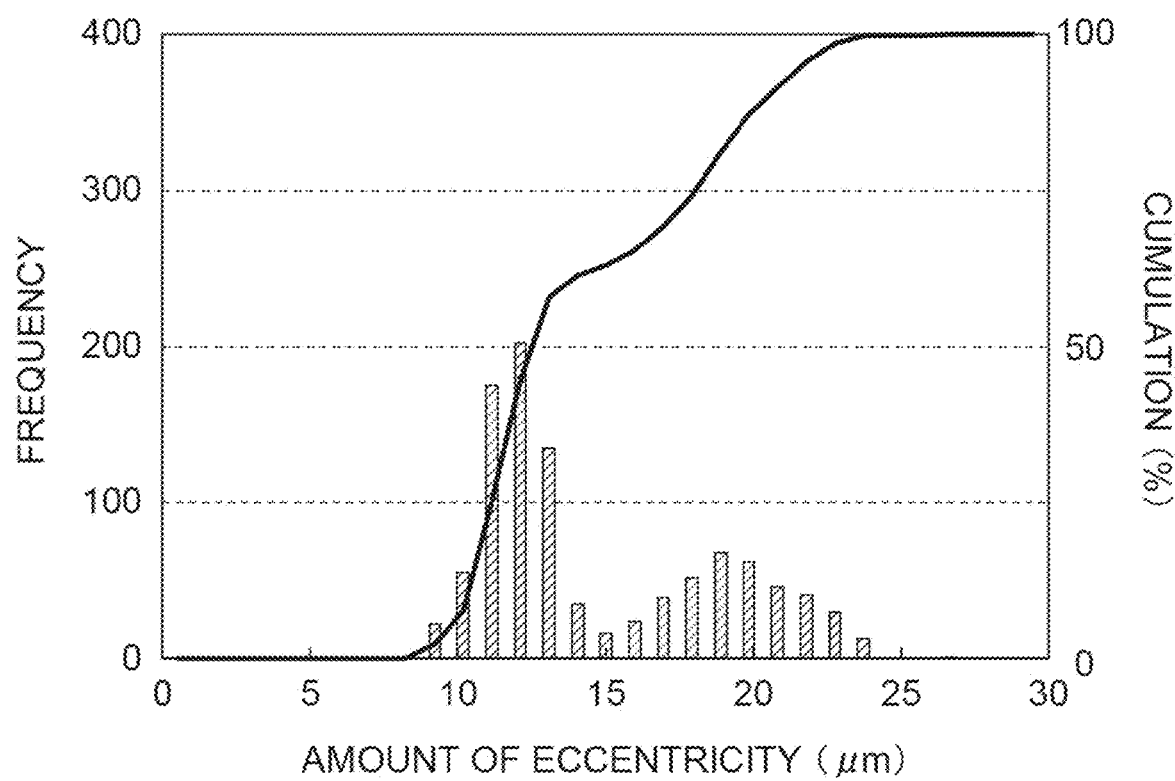
FIG. 10 is a histogram and a cumulative line graph of the amount of eccentricity of the glass fiber according to Experimental Example 3.

FIG. 9 is a graph illustrating a waveform of the amount of eccentricity of a glass fiber according to Experimental Example 3. FIG. 10 is a histogram and a cumulative line graph of the amount of eccentricity of the glass fiber according to Experimental Example 3. In the optical fiber according to Experimental Example 3, the histogram is bimodal as illustrated in FIG. 9, and the value of a+3σ exceeds 10 μm as shown in Table 1. The defect scrap rate of the optical fiber according to Experimental Example 3 exceeds 80%.

The defect scrap rate of the lot of the optical fiber according to Experimental Example 6 is 1.1%. It is thus extremely difficult to detect defective portions in the conventional sampling inspection in which the amount of eccentricity is inspected only at both ends of the picking of a good optical fiber. The defect scrap rate of the lot of the optical fiber according to Experimental Example 7 is also low at 9.10%, with good portions exceeding 90%. It is thus difficult to detect defective portions by a sampling inspection. The method for manufacturing the optical fiber 1 according to this embodiment is capable of easily detecting defective portions since the amount of eccentricity d of the glass fiber 10 is measured on-line during drawing. Furthermore, the amount of eccentricity d can be adjusted on the basis of the result of measurement of the amount of eccentricity d.

In the case in which the histogram is bimodal such as in the optical fibers according to Experimental Examples 2, 3, and 5, there is a variation in the amount of eccentricity which tends to cause a high defect scrap rate.

In the optical fiber according to Experimental Example 8 which was manufactured under the same conditions as those of Experimental Example 1, the amount of eccentricity was measured at 4000 points over a length of 3000 m or more of the glass fiber. Similarly to the optical fiber according to Experimental Example 1, in the optical fiber according to Experimental Example 8, it was confirmed that the histogram was unimodal, and the defect scrap rate was 0%. As the length of the optical fiber increases, the trouble of discarding defective portions increases, so that the effect of reducing the defect scrap rate is greater.

Although the embodiments and variations have been described, the present disclosure is not necessarily limited to the embodiments and variations described above, and many modifications are possible without departing from the gist thereof. The embodiments and variations above may be combined as appropriate.

What is claimed is:

1. A method for manufacturing an optical fiber comprising:
   melting an optical fiber preform and drawing a glass fiber;
   applying a resin composition to an outer periphery of the glass fiber; and
   curing the resin composition applied,
   wherein an amount of eccentricity of a central axis of the glass fiber, in a cross section perpendicular to the central axis of the glass fiber, from a central axis relative to an outer periphery of the resin composition or an outer periphery of a coating resin layer formed by curing the resin composition is measured at 50 points or more over a length range of 50 m or more of the glass fiber at a sampling period of 20 ms or less,
   wherein the resin composition is applied such that a mean value a and a standard deviation σ of the amount of eccentricity satisfy a+3σ≤10 μm,
   wherein the resin composition is applied such that a histogram of the amount of eccentricity is unimodal when a class width is 1 μm, and
   wherein the resin composition is applied while adjusting at least one of
   (A) a position or a tilt of an application device for applying the resin composition; and
   (B) a position of the optical fiber preform, or a position of a roller disposed directly below a curing device and configured to change a running direction of the optical fiber, the curing device being configured to cure the resin composition.

2. The method for manufacturing an optical fiber according to claim 1, wherein the amount of eccentricity is measured before the curing step, and is measured as an amount of eccentricity of the glass fiber from the central axis relative to the outer periphery of the resin composition.

3. The method for manufacturing an optical fiber according to claim 1, wherein the measuring step is performed after the curing step, and the amount of eccentricity is measured as an amount of eccentricity of the glass fiber from the central axis relative to the outer periphery of the coating resin layer.

4. The method for manufacturing an optical fiber according to claim 1, wherein a measurement interval of the amount of eccentricity is 100 m or less.

5. The method for manufacturing an optical fiber according to claim 1, wherein a measurement interval of the amount of eccentricity is 50 m or less.

6. The method for manufacturing an optical fiber according to claim 1, wherein a measurement interval of the amount of eccentricity is 1 m or less.

7. The method for manufacturing an optical fiber according to claim 1, wherein the amount of eccentricity is measured at 1000 points or more over a length range of 1000 m or more of the glass fiber.

8. The method for manufacturing an optical fiber according to claim 1, wherein the resin composition is applied such that a+3σ≤10 μm is satisfied.

* * * * *